United States Patent [19]

Kawada et al.

[11] Patent Number: 5,204,851
[45] Date of Patent: Apr. 20, 1993

[54] APPARATUS FOR READING AND/OR INPUTTING INFORMATION

[75] Inventors: Haruki Kawada, Yokohama; Hideyuki Kawagishi, Ayase; Kiyoshi Takimoto, Isehara; Yuko Morikawa, Kawasaki, all of Japan

[73] Assignee: Canon Kabushiki Kaisha, Tokyo, Japan

[21] Appl. No.: 738,113

[22] Filed: Jul. 30, 1991

[30] Foreign Application Priority Data

Aug. 1, 1990 [JP] Japan .................. 2-205831

[51] Int. Cl.⁵ .................................. G11B 9/00
[52] U.S. Cl. .......................... 369/126; 365/151
[58] Field of Search .............. 369/126; 365/151

[56] References Cited
U.S. PATENT DOCUMENTS 4,829,507 5/1989 Kazan et al. ............... 369/126
4,945,515 7/1990 Ooumi et al. ............... 369/126

FOREIGN PATENT DOCUMENTS 63-161552 7/1988 Japan .
63-161553 7/1988 Japan .

OTHER PUBLICATIONS

Binnig, et al., "Scanning Tunneling Microscopy," Helvetica Physica Acta, vol. 55, 1982, pp. 726 through 735.

Primary Examiner—Jack I. Berman
Attorney, Agent, or Firm—Fitzpatrick, Cella, Harper & Scinto

[57] ABSTRACT

An apparatus for reading information from an information medium and/or inputting information to the information medium through a probe electrode includes a voltage application circuit for applying voltage between the probe electrode and the information medium, information reading from the information medium and/or information inputting to the information medium being performed by the voltage application by the voltage application circuit, and a charge removing device to perform a charge removing process for the information medium to which voltage is applied by the voltage application while maintaining the information in the information medium, making it possible to perform highly precise information reading and/or inputting at all times without producing any adverse effects on the information medium due to the charge deposition resulting from the voltage application.

24 Claims, 14 Drawing Sheets

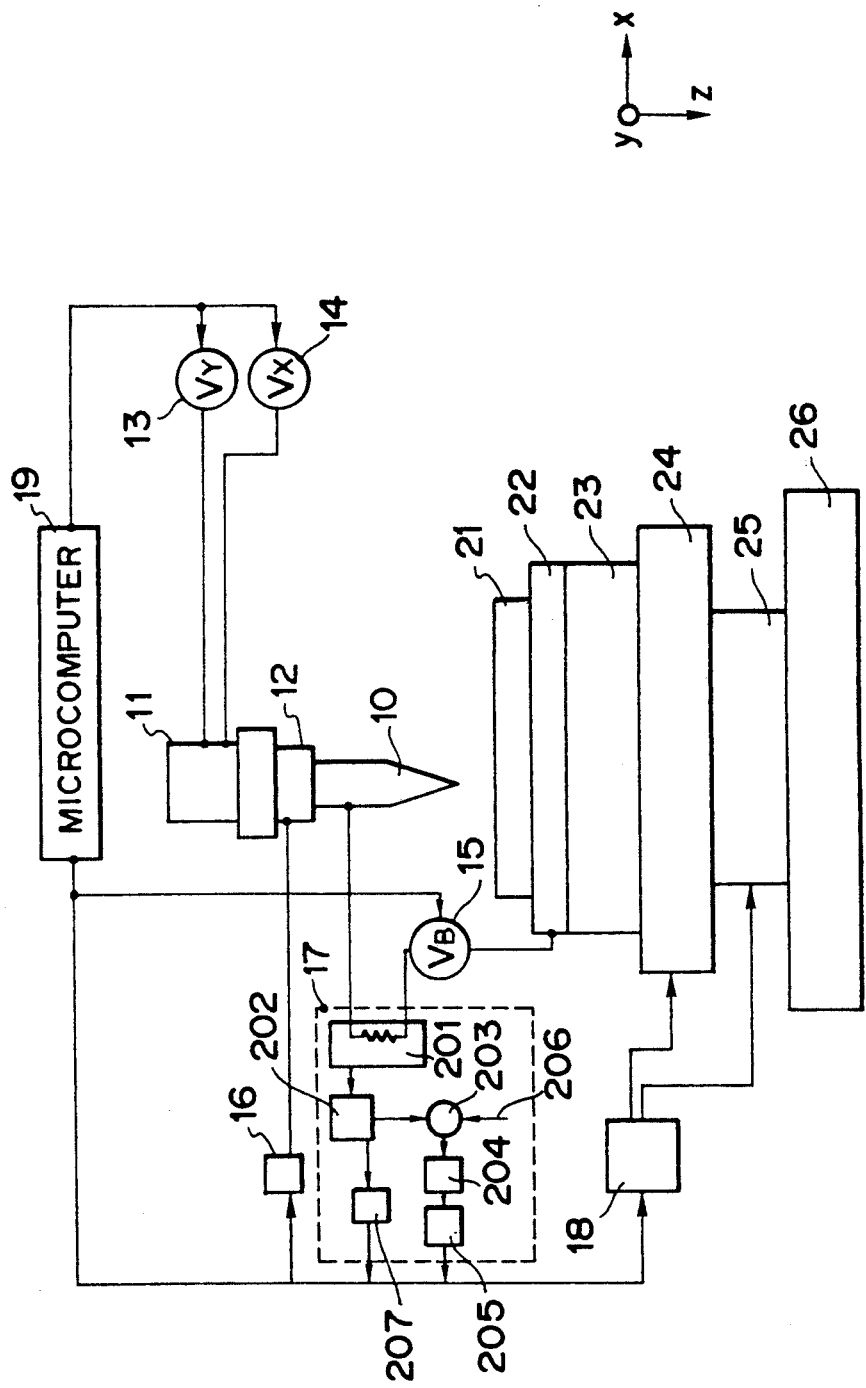

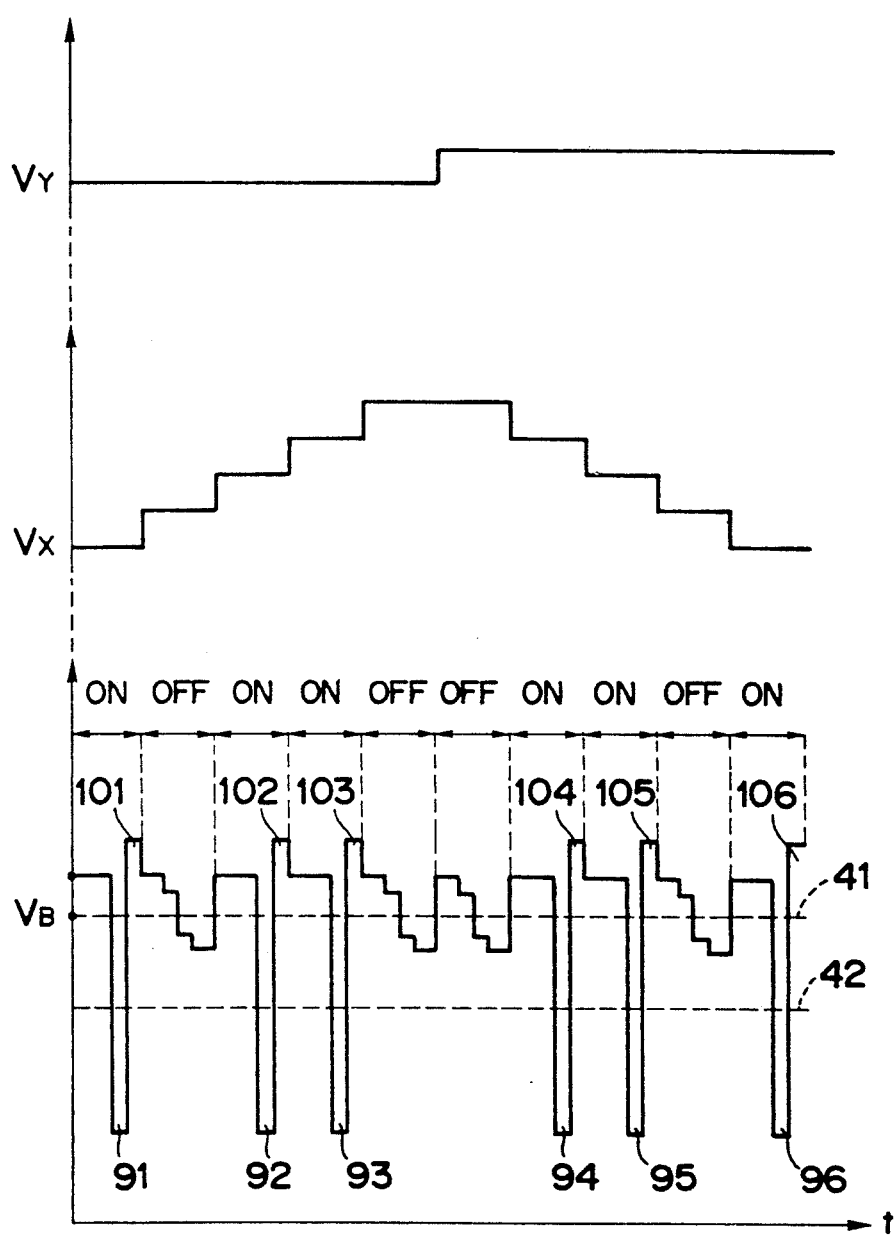

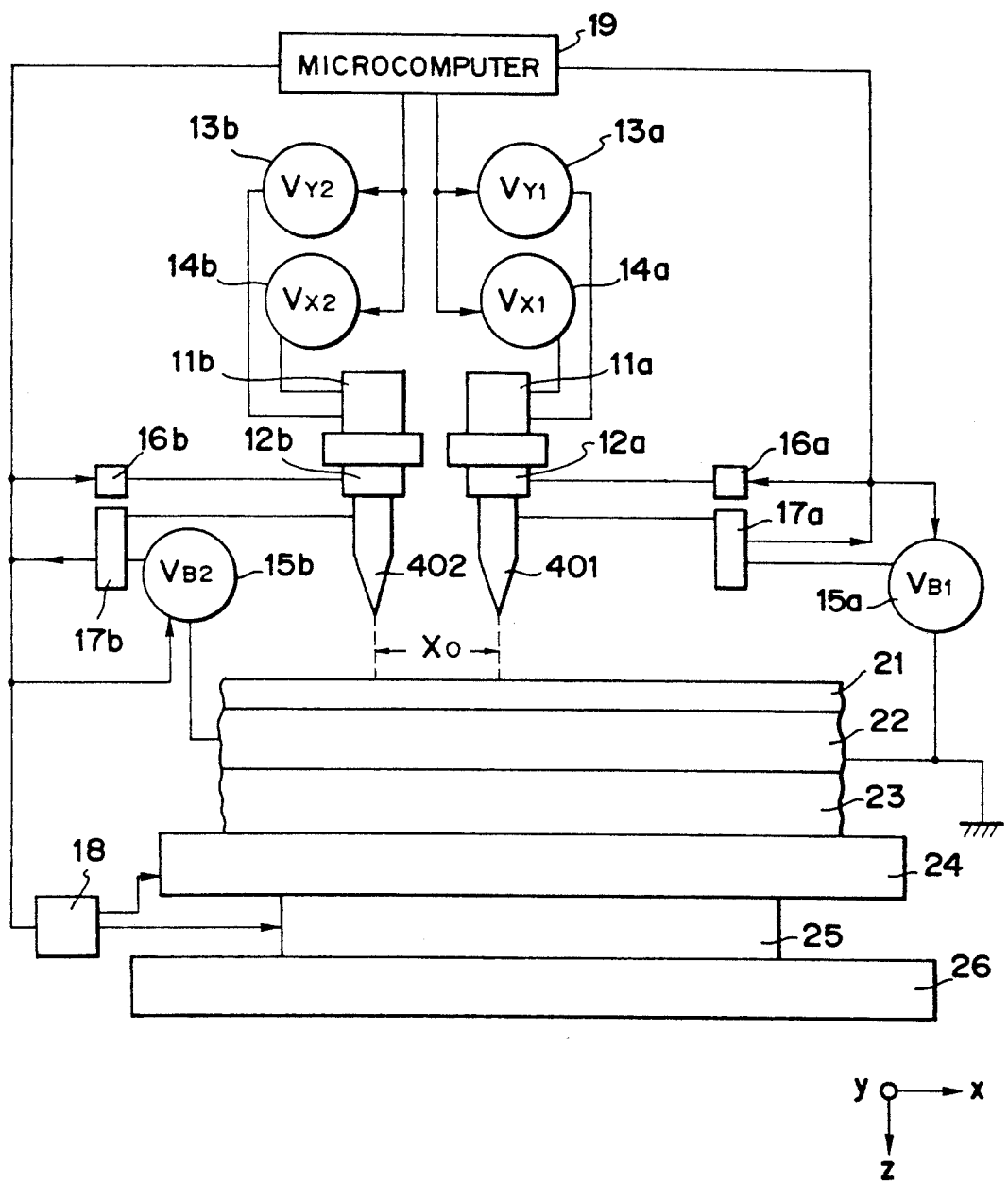

F I G. 10
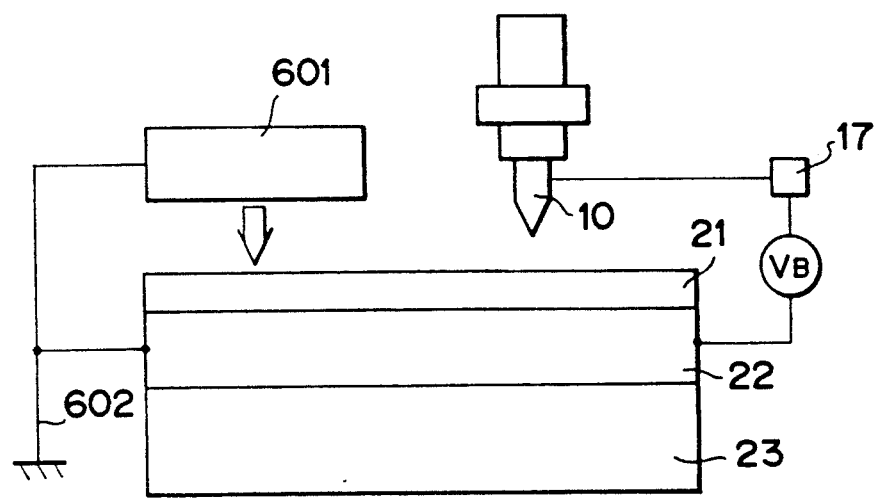

APPARATUS FOR READING AND/OR INPUTTING INFORMATION

BACKGROUND OF THE INVENTION

Field of the Invention

The present invention relates to an apparatus for reading and/or inputting information and a method therefor. More particularly, the present invention relates to an apparatus for reading and/or inputting information and a method therefor by applying a voltage to a recording medium when information is read or inputted.

The present information is particularly suited for a recording and reproducing apparatus utilizing the principle of the scanning tunnel microscope (STM).

Related Background Art

In recent years, the use of memory materials has been the core of electronics industries such as computers and its peripheral equipment, video discs, and digital audio discs, and the development of the materials is in progress quite actively. Although the required capability of the memory material depends on its usage, such material should have the advantages given below in general among others.

① High-density and large recording capacity
② Quick responsibility to recording and reproducing
③ Small power consumption
④ High-productivity and low cost Traditionally, semiconductor memories and magnetic memories using a magnetic substance or semiconductor have been employed in most cases. In recent years, however, along with the evolution of the laser technology, inexpensive and high-density recording media by optical memories using organic thin films such as organic coloring matter and photopolymers have come to the foreground.

Meanwhile, a scanning tunnel microscope (hereinafter referred to as "STM") capable of directly observing the structure of electrons on the surface atom of a conductor has recently been developed [G. Binnig et al., Helvetica Physica Acta, 55, 726 (1982)], and it becomes possible to measure a real space image with high resolution irrespective of a single crystalline or amorphous medium, yet without causing any damage thereto by its advantage that the observation is possible with a low electric power. Further, since the STM is operative in the atmosphere as well as usable for various kinds of materials, a wide range of applications is anticipated.

The STM utilizes the fact that when a metallic probe (probe electrode) and a conductive substance approach each together up to a distance of approximately 1 nm while a voltage is being applied therebetween, a tunnel current flows. This current is quite sensitive to the difference in the distances between them. Therefore, it is possible to draw the surface structure in a real space by enabling the probe to scan so that a constant tunnel current is maintained, and at the same time to read various information concerning the entire electron cloud. At this juncture, the resolution in the direction toward the inner surface is approximately 1 Å. Accordingly, by applying the principle of the STM it is possible to perform a high-resolution recording and reproducing with an atomic order (several Å) satisfactorily. For recording and reproducing methods in this case, there has been proposed a method for recording performed by changing the surface condition of an appropriate recording layer using a high-energy magnetic wave of corpuscular rays (electron beam or ion beam) or X-rays and an energy beam of visible or ultraviolet rays and then reproducing by the STM. Alternatively, there is a method for recording and reproducing using the STM by the use of a material as a recording layer, which has memory effects with respect to the voltampere switching characteristics, such as a thin film layer of an organic compound of a $\pi$ electron system, chalcogen compound or the like.

However, it is required to apply a voltage in a constant direction from the probe to the medium intermittently or continuously at the time of recording or reproducing in the conventional method using the STM principle. For example, therefore, in the case where the medium has an organic thin film which is not conductive, or the like, the charge is accumulated on the surface of the medium thereby. There is a possibility that due to the accumulated charge, floating molecules are absorbed onto the surface of the medium, or the organic thin film or the like is caused to be degraded or decomposed.

Particularly, in the case of the recording and reproducing method using the STM principle, the recording and reproducing are performed in an area of an extremely narrow molecular order as compared with the conventional systems. Therefore, even an extremely small absorption of molecules to the surface of the recording medium, which should be negligible in the usual floppy disc type magnetic or optomagnetic recording and reproducing apparatus, or an extremely slight degradation or decomposition of the film quality, may cause a failure in writing or an error in reading.

We have found there is a possibility that the charge generated as described above adversely affects on the recording and reproducing whereas the charge is not essentially related to such recording and reproducing, when the information is recorded onto the medium having an effect of changing the characteristic or the shape of the medium by applying voltage upon inputting of information or an effect capable of detecting said changes by applying voltage upon reading of information (in the present specification, such effects are referred to as "electric memory effect"), by applying voltage to thereby cause the electric memory effect, or when the information recorded by the electric memory effect is reproduced by applying voltage.

SUMMARY OF THE INVENTION

In consideration of the aforesaid conventional example, a first object of the present invention is to provide an apparatus for reading and inputting of information with a medium having said electric memory effect by applying voltage in which the absorption of molecules, the degradation and decomposition of the medium and the like are eliminated, thus preventing errors in reading and inputting information.

The other objects of the present invention will be clear from the detailed description of the embodiments thereof to be given later.

BRIEF DESCRIPTION OF THE DRAWINGS

FIG. 1 is a view schematically showing the structure of a first embodiment of an information recording and reproducing apparatus according to the present invention.

FIG. 5 is a time chart showing driving voltage and applied voltage at the time of information recording in an information recording and reproducing apparatus of a third embodiment according to the present invention;

FIG. 7 is a view schematically showing an information recording and reproducing apparatus of a fifth embodiment according to the present invention;

FIG. 10 is a schematic view partially showing structure of an information recording and reproducing apparatus of a seventh embodiment according to the present invention.

DESCRIPTION OF THE PREFERRED EMBODIMENTS

Figure 2A:
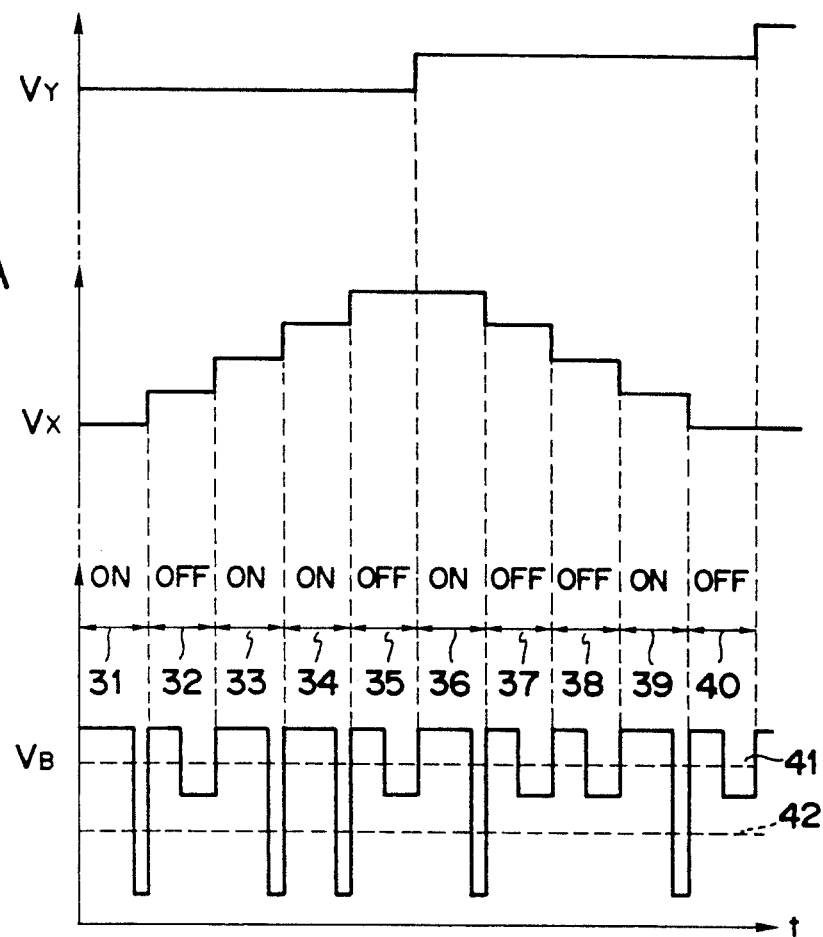
FIG. 2A and FIG. 2B are a time chart showing driving voltage and applied voltage at the time of information recording in the apparatus, and a view schematically showing a manner of information recording in the state of voltages, respectively.

FIG. 1 is a view showing the structure of the recording and reproducing apparatus of a first embodiment according to the present invention. In FIG. 1, numeral 10 designates a probe electrode; 22, a substrate electrode; and 21, a recording medium having the electric memory effect, which is sandwiched between the probe electrode 10 and substrate electrode 22. The substrate electrode 22 and recording medium 21 are formed integrally on a substrate 23. A numeral 15 designates a voltage application means to apply a voltage between the probe 10 and substrate electrode and generate a volta $V_B$. A numeral 17 designates a current detection means to detect a current flowing between the probe electrode 10 and recording medium 21; 12, a Z-direction fine traveling control mechanism to cause the probe electrode 10 to travel in the Z direction finely; 16, a servo circuit to control the distance (Z direction) between the probe electrode 10 and recording medium 21 using the Z-direction fine traveling control mechanism 12 on the basis of the current detection means 17. The servo circuit 16, current detection means 17, and Z-direction fine traveling mechanism 12 constitute a part of a space controlling means to control the distance between the probe 10 and recording medium 21. In the current detection means 17, a numeral 201 designates a primary current-voltage converter having a sufficiently small inner resistance $\gamma$ as compared with the resistance between the probe electrode 10 and substrate electrode 22, which outputs the detected current value after having converted it into a sufficiently large voltage signal corresponding thereto. Also, a numeral 202 designates a converter for converting the voltage signal containing the signed (positive or negative) current ($J_T$) received from the current-voltage converter 201 to a signal corresponding to a logarithmic value $\log |J_T|$ of the absolute value of the current $J_T$, and the output therefrom is transmitted to a differential divider 203. The differential divider 203 outputs the difference between a signal 206 and a signal corresponding to the $\log |J_T|$, the signal 206 corresponding to the logarithmic value of the predetermined value of the tunnel current defined so as to make the space between the probe electrode 10 and recording medium 21 a predetermined value. This differential signal is transmitted to a frequency filter 204 thereby to cut the high-frequency signal corresponding to the recording information. A numeral 205 designates an amplifier circuit for amplifying a signal which has passed through the filter 204. The signal passed through the amplifier circuit 205 becomes an information signal having an averaged space (averaged space of an area sufficiently larger than the recording bit) between the recording medium 21 and probe 10, which is transmitted to a microcomputer 19. Then, on the basis of this information signal, the microcomputer 19 transmits an instruction signal to the servo circuit 16 so as to make the averaged space between the probe electrode 10 and recording medium 21 constant.

Also, a part of the output of the converter 202 is directly transmitted to the microcomputer 19 through a frequency filter 207 which passes a high-frequency signal and cuts a low frequency signal such as corresponding to the averaged space information between the probe electrode 10 and recording medium 21. At the time of information reproducing, this signal becomes the recording information signal, which is processed by the microcomputer 19 to reproduce.

A numeral 11 designates an x-y direction fine traveling control mechanism for driving finely the probe electrode 10 and fine traveling control mechanism 12 in the x-y direction to cause the probe electrode 10 to travel finely along the surface of the recording medium 21. Numerals 13, 14 designate a y-axial scanning driver and an x-axial scanning driver for applying a y-direction driving control voltage $V_Y$ and an x-direction driving control voltage $V_X$ to the x-y direction fine traveling control mechanism 11, respectively. The x-y direction fine traveling control mechanism 11 causes the probe electrode 10 to be displaced in the x-y directions in accordance with the voltage value applied respectively by the drivers 13 and 14. A numeral 24 designates an x-y stage to enable the substrate 23 to travel in the X-Y directions roughly; 25, a rough traveling mechanism to cause the x-y stage 24 to travel in the Z direction roughly; 18, a rough traveling driver to transmit controlling signals to the x-y stage 24 and rough traveling mechanism 25 in accordance with the instruction signals from the microcomputer 19; and 26, a support base.

Now, the operation of the recording and reproducing in the structure set forth above will be described.

Figure 2B:
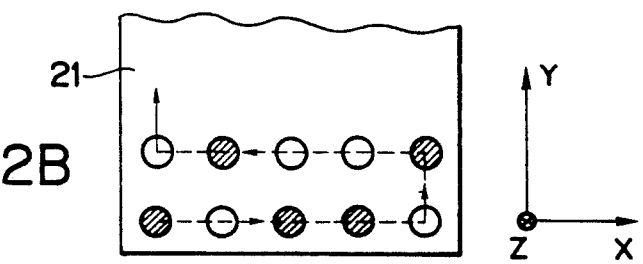

FIG. 2A and FIG. 2B illustrate the changes per time t in the x and y direction driving control voltages $V_X$ and $V_Y$ and the applied voltage $V_B$ by the voltage application means 15 at the time of information recording, i.e., the output states of the drivers 13 and 14 which have received instruction from the microcomputer 19 and the means 15 as well as the manner in which the recording is performed at that time. The upper stage of FIG. 2A shows the waveforms per time of the Y-axial driving control voltage $V_Y$ applied to the x-y direction fine traveling control mechanism 11 which causes the probe electrode 10 to travel along the surface of the recording medium 21; the middle stage thereof, the waveforms per time of the driving control voltage $V_X$ in the X axial direction applied to the x-y fine traveling control mechanism 11; and the lower stage thereof, the waveforms per time of the voltage applied between the probe 10 and substrate electrode 22. FIG. 2A is a time chart of the applied voltage at the time of recording, and FIG. 2B is a view schematically showing the manner in which information is written onto the recording medium according to the time chart shown in FIG. 2A as an example.

When the voltage $V_X$ and voltage $V_Y$ are applied as shown in the upper and middle stages of FIG. 2A, the tip of the probe electrode 10 travels along arrows sequentially over the positions represented by ○ on the recording medium 21 as shown in FIG. 2B. The traveling of the probe electrode 10 is substantially instantaneous, and the probe electrode 10 stops at the positions represented by ○ for a predetermined period of time. In the lower stage of FIG. 2A, this predetermined period of time is shown by numerals 31 to 40 per each position represented by mark ○, and also in each of the positions marked ○, the position at which a predetermined voltage is applied to generate a change in the recording medium 21, is represented by slanted lines in ○ in FIG. 2B. (This change, for example, is a shift from the off-state to on-state in a recording medium showing the memory switching characteristics as disclosed in Japanese Patent Laid-Open Application No. 63-161552). Further, the period during which the voltage causing such change is applied is represented by "on" in FIG. 2A, and all the other periods, by "off". Hereinafter, in the other embodiments which will be described later, the representation is also made by "on" and "off" in the same manner as in this case.

In the lower stage of FIG. 2A, the broken line 41 shows the upper potential level (zero level) of the recording medium 21, and the broken line 42 shows the threshold potential which causes the recording medium 21 at the phase level indicated by the broken line 41 to change (shifting to the on-state), respectively. In the present embodiment, each of the recording bit positions, i.e. in each of the periods 31–40, the value of time integration [$\int V_B(t) dt$], of the applied voltage $V_B$ (voltage between the medium 21 and probe electrode 10) to the recording medium is substantially zero. In other words, the averaged value of $V_B$ in each of the periods becomes substantially zero. Specifically, when there is no application of the voltage changing the state of the medium, which is represented by "off", the absolute value of the applied voltage $V_B$ should be equalized at a half point in each of the periods to inverse plus and minus. The absolute value of the applied voltage $V_B$ at this time should be the value suited for detecting the tunnel current $J_T$ in order to control the average space between the probe electrode 10 and recording medium 21 constantly by the space controlling means for controlling the distance between the aforesaid probe electrode 21. This value should be defined to be smaller than the threshold value to generate a change in the medium 21 (to change the state to be "on"), and if the absolute value is equal, there is no substantial change in the output from the converter 202 even when the sign of the applied voltage $V_B$ changes. Thus, the aforesaid average space control is performed during this period without any substantial effect from such a change in the sign of the voltage $V_B$. Also, when the voltage changing the medium represented by "on" is applied, during the period represented by "on" the state in which the absolute value of the voltage $V_B$ is equal, should be maintained in the most part of the period and the sign of the voltage $V_B$ is inverted in the last short period and the value of the voltage $V_B$ is made to exceed the threshold value 42. At this juncture, the value of the voltage should be adjusted to be [$\int V_B(t) dt$]≈0. If a large value such as exceeding the threshold value is applied, the value of the tunnel current $J_T$ is increased during such period. However, since this change is short enough, the aforesaid space controlling means does not substantially cause the probe electrode 10 to change its position in the Z direction practically by this change in the value of the tunnel current $J_T$. In other words, at the time of the medium changing voltage being applied, the aforesaid averaged space control is executed continuously without receiving an effect produced by the application of a large voltage.

As the above describes, irrespective of whether the medium changing (shifting to the "on" state) is generated or not, the charge once accumulated by the voltage applied in one direction in a fine region at which each of the recording positions is a center is diffused by the voltage applied in the opposite direction while making the value of time integration of the applied volta $V_B$ substantially zero in each of the entire recording bit positions (positions represented by ○), and this charged state is eventually returned to the potential state before the recording (removed electrically). Therefore, the potential state over the entire recorded area of the recording medium is not changed substantially. In this respect, it may be possible to define the voltage exceeding the threshold value, (i.e., the time at which the voltage exceeding the threshold value is applied during the period), at the start of each of the periods not at the end thereof.

Particularly, as shown in the lower stage of FIG. 2A, in the first embodiment the sections selected by the means 11 to enable the probe electrode 10 to travel along the surface of the recording medium 21, have a point symmetry. In other words, during the period represented by "off" the waveforms of the applied voltage between the probe electrode 10 and substrate electrode 22 in the fine region having each of the recording bit positions as its center have the point symmetry. By using the waveforms having the point symmetry as the waveform of the applied voltage corresponding to the periods represented by "off", not only is it possible to perform [$V_B(t) dt$]≈0 easily in this period, but by making the pulses point symmetric, it is also possible to avoid an extremely intensified voltage to be applied locally in the region where no change is generated in the recording medium.

Also, particularly, as shown in the lower stage of FIG. 2A, in the first embodiment the sections selected by the means 11 to enable the probe electrode 10 to travel along the surface of the recording medium 21 in the waveforms in the periods represented by "on", have a point asymmetry. In other words, the waveforms of the voltage applied between the probe electrode 10 and substrate electrode 22 in the fine region having each of the recording bit positions as its center have the point asymmetry to any points in the section.

By using the waveforms having the point asymmetric property to any other points as the waveforms of the applied voltage corresponding to the periods represented by "on", it becomes easy to apply an extremely intensified voltage locally under a condition of $[\int V_B(t) dt] \cong 0$ within this period; making it possible to cause the medium change (shifting to the "on" state) more reliably than in a conventional case.

As the recording medium 21, an organic thin film having memory switching characteristics such as disclosed in Japanese Patent Laid-Open Application No. 63-161552 is considered applicable.

Here, an example is considered for a recording medium which shows the "on" state against an applied voltage having the threshold value of approximately three volts or more, while holding the "off" state against an applied voltage of approximately three volts or less without any change in its "on" state.

In the waveforms of the applied voltage corresponding to the "on" state represented in the periods 31, 33, 34, 36, and 39 in FIG. 2A, when, for example, the applied voltage $V_B$ of positive polarity period $8\Delta T$ (where $\Delta T$ is a 1/10 of the time in one period) in the fore part of each period is given as $+1V$ and the applied voltage $V_B$ of negative polarity period $2\Delta T$ in the rear part is $-4V$, these become $8\Delta T \times 1V + 2\Delta T \times (-4) \ V = 0$. Thus, an application of voltage to the recording medium 21, corresponding to the "on" state can be realized in a condition that the value of time integration of the applied voltage in the fine region having each of the recording bits as its center is zero.

Also, in the waveforms of the applied voltage corresponding to the "off" state represented in the periods 32, 35, 37, 38, and 40 in FIG. 2A, when, for example, the applied voltage $V_B$ of positive polarity period $5\Delta T$ in the fore part of each period is given as $+1V$ and the applied voltage $V_B$ of negative polarity period $5\Delta T$ in the rear part is $-1V$, these become $5\Delta T \times 1V + 5\Delta T \times (-1) \ V = 0$. Thus, an application of voltage to the recording medium 21, corresponding to the "off" state (here, the application of voltage by which the state of the medium is not particularly allowed to be changed) can be realized in a condition that the value of time integration of the applied voltage in the fine region having each of the recording bits as its center is zero.

Subsequently, the information reproducing will be described.

Figure 3:
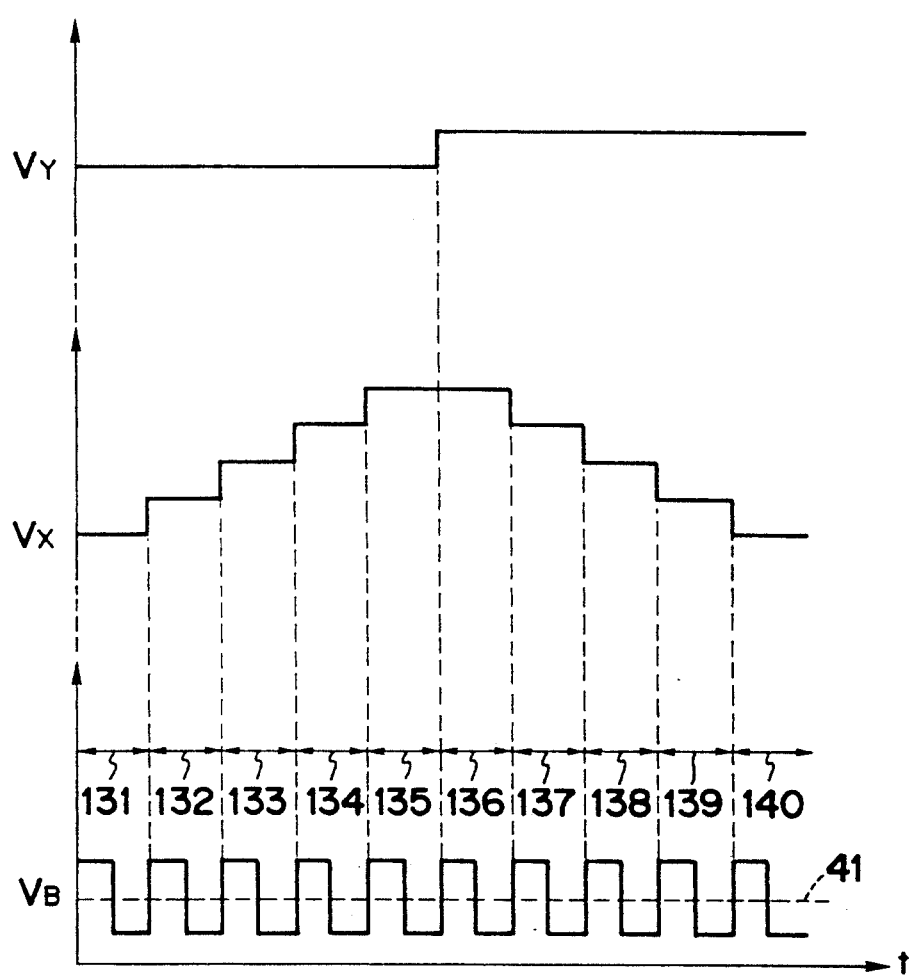
FIG. 3 is a time chart showing driving voltage and applied voltage at the time of information reproducing in the apparatus.

FIG. 3 is a view illustrating the changes per time t of the driving control voltages $V_X$ and $V_Y$ in the x and y directions at the time of information reproducing, and of the applied voltage $V_B$ by the voltage application means 15. FIG. 3 is represented by the same time chart as shown in FIG. 2A. Here, the x-y direction driving of the x-y direction fine traveling mechanism 11 portion including the probe electrode 10 is the same as that of information recording, so its description is omitted.

As in the case of the information recording, the suspension periods of the probe electrode 10 are designated by numerals 131 to 140. At each of the recording bit positions also in information reproducing, i.e., in each of the periods 131 to 140, the value of time integration $[\int V_B(t) dt]$ of the applied voltage $V_B$ to the recording medium is substantially zero. Specifically, at a half point of each period, the absolute value of the applied voltage $V_B$ should be equalized to invert plus and minus. The absolute value of the applied voltage $V_B$ at this time should be the value suited for detecting the tunnel current $J_T$ in order to control the averaged space between the probe electrode 10 and recording medium 21 constantly by the space controlling means therebetween and to reproduce information. It is needless to mention that this value is smaller than the threshold value which generates changes in the medium 21. If the absolute value is equal, the output from the converter 202 does not practically change even when the sign of the applied voltage $V_B$ changes, and during this period, the averaged space control and the reproducing of the recorded information are executed without receiving any substantial effect from changes in the sign of the applied voltage $V_B$.

Now, since the information reproducing operation is repeatedly performed, the charge is accumulated by the applied voltage, and it is more liable to generate the molecular absorption on the surface of the recording medium or the degradation or deterioration of the film quality than that of the information recording. Therefore, it is particularly effective to make $[\int V_B(t) dt] = 0$ at each of the recording bit positions.

Also, in consideration of the repeating operation of the information reproducing, it is particularly effective to avoid by the waveforms having the point symmetry any extremely intensified voltage which is locally applied.

Figure 4:
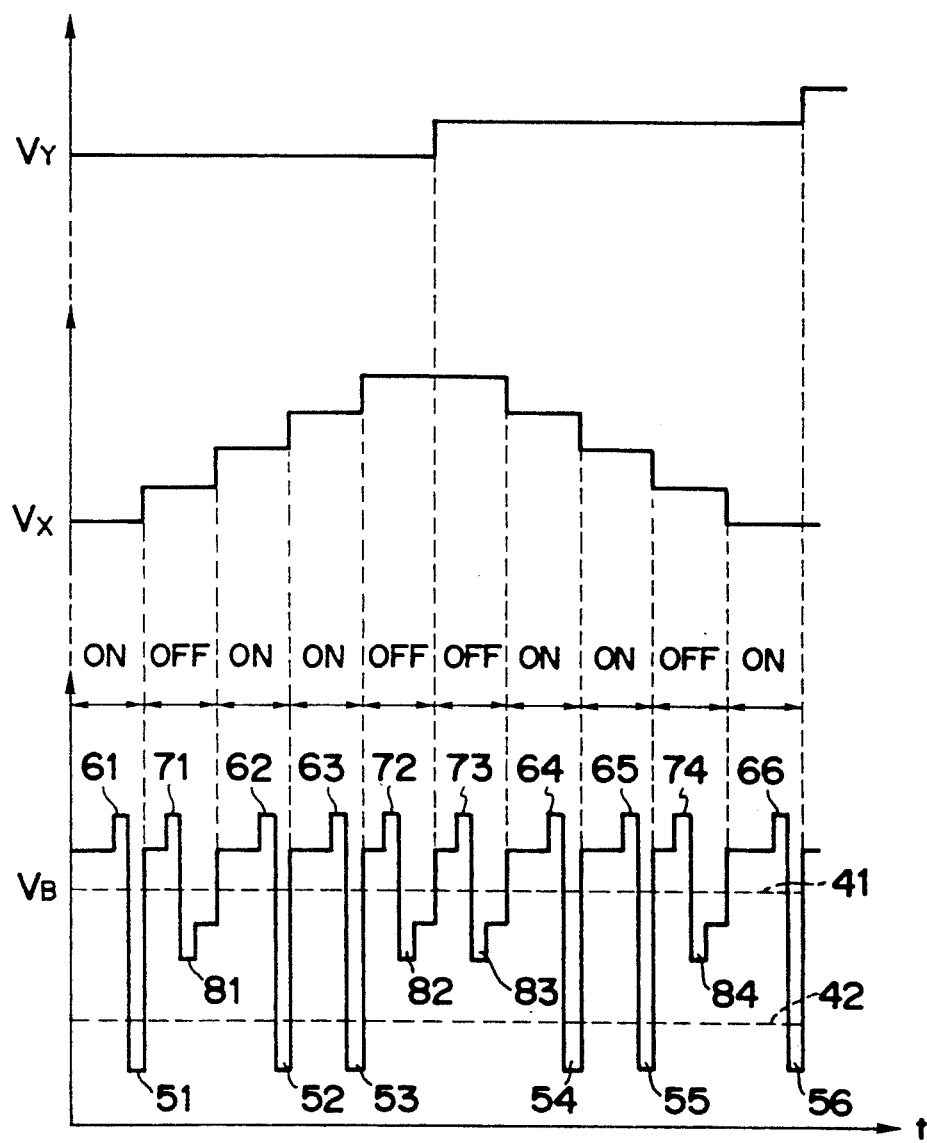
FIG. 4 is a time chart showing driving voltage and applied voltage at the time of information recording in an information recording and reproducing apparatus of a second embodiment according to the present invention.

FIG. 4 is a time chart showing the application state of each of the voltages $V_X$, $V_Y$, and $V_B$ per time t when the information recording is performed by a recording and reproducing apparatus of a second embodiment according to the present invention. The structure of the apparatus is the same as shown in FIG. 1, and the application state of each of the voltages $V_X$, $V_Y$, and $V_B$ per time t when the information reproducing is performed, is the same as shown in FIG. 3. Further, the x-y direction driving of the probe electrode 10 is the same as described in conjunction with FIG. 2. Therefore, its description of these aspects is omitted.

The second embodiment is characterized in that before or after or both before and after (in FIG. 4, the case of only before is shown) the application of a large voltage exceeding the aforesaid threshold value during the "on" period represented in the lower stage of FIG. 4, the pulse having the voltage with an inverted sign, which is slightly larger than the voltage for detecting the tunnel current $J_T$, (but does not exceed the threshold value) is once added. (Hereinafter, this pulse voltage is referred to as "auxiliary pulse").

That is, the present embodiment is characterized by having the auxiliary pulses (designated by numerals 61 to 66) whose absolute voltages are intensified in the opposite polarity to written pulses before the pulse portions 51 to 56 with the voltage exceeding the threshold value (i.e. the written pulse), in the waveforms during the period represented by "on" in FIG. 4. Hence, it is possible to make the absolute value of the written pulse voltage large with ease under the condition of $[\int V_B(t) dt] = 0$ in this period, and to execute the medium change (shifting to the "on" state) more reliably. The period of the auxiliary pulse should be short enough so that the change in the tunnel current $J_T$ upon the auxiliary pulse application does not have an effect on the control for making the averaged space between the probe electrode 10 and recording medium 21 constant by said space controlling means. However, in the case where the probe electrode 10 tends to travel following the changes in the tunnel current $J_T$ upon the application of the written pulse or the auxiliary pulse (i.e. gain being great) due to a slightly intensified feedback of the space controlling means, the space between the probe electrode 10 and recording medium 21 can be made larger once prior to the application of the written pulse, by adding these auxiliary pulses 61 to 66. If the space is made large in advance, as in case, the changes in the tunnel current $J_T$ upon the written pulse application can be made small, and an effect is obtainable to prevent the space controlling means from becoming unstable.

This second embodiment is also characterized by having the pulse voltages (auxiliary pulses) with a comparatively large point symmetry designated by numerals 71 to 74 and 81 to 84 provided before and after the boundary where the signs of the voltage $V_B$ are changed, in the waveforms of the applied voltage corresponding to the period represented by "off". In the case where the space controlling means possesses a slightly intensified feedback, it is possible by this feature as in the period represented by "on" to change the voltage polarities while keeping the probe electrode 10 slightly away from the surface of the recording medium. There are some cases where depending on the material of the recording medium, an adverse effect such as the deterioration of quality thereof is observed due to the rapid inverting of the polarity. However, by inverting the polarity after the space has once been made larger, the electric field in the recording medium 21 is changed, whereby an effect is obtainable to change the electric field in the recording medium 21 comparatively smoothly together with the nonlinearity of the tunnel current.

FIG. 5 is a view showing a third embodiment according to the present invention.

The third embodiment is the same as the first embodiment with the exception of the aspects set forth below. Therefore, the description is made only by the same time chart as shown in FIG. 2A. The third embodiment is characterized in that in the waveforms of the applied voltage in the period represented by "off", when the absolute value of the applied voltage $V_B$ is equalized to invert plus and minus as in the case of the first embodiment, there are provided a plurality of periods with at least three or more periods where the voltage $V_B$ is constant before and after this inverting portion, and portions in which the level of the relative voltage is gradually decreased or increased in the plurality of periods.

As the above describes, by changing the level of the relative voltage gradually, it is possible to change the signs of the voltage $V_B$ smoothly under a condition of $[\int V_B(t) dt] \approx 0$ in this period, and to prevent the space controlling means from becoming unstable due to a rather large current to be generated by the accumulated charge when the polarity of the applied voltage is changed rapidly as well as the quality of the recording medium from being deteriorated due to the rapid change of the polarity.

In other words, the third embodiment has the auxiliary pulse in the direction in which $|V_B|$ is made small, before and after the boundary where the signs of the voltage $V_B$ are changed in the waveforms in the periods represented by "off". This auxiliary pulse is effective when the feedback of the space controlling means is weak (gain being small).

The third embodiment is also characterized by having the auxiliary pulses (designated by numerals 101 to 106) whose absolute voltages are intensified in the direction of the opposite polarity to the written pulses after the written pulse portions 91 to 96, in the waveforms of the applied voltage in the period represented by "on". Thus, as in the case of the auxiliary pulses of the second embodiment, it becomes easy to make the absolute value of the pulse voltage large under the condition of $[\int V_B(t) dt] \approx 0$ during this period, and to perform the medium change (shifting to the "on" state) more reliably.

Figure 6A:
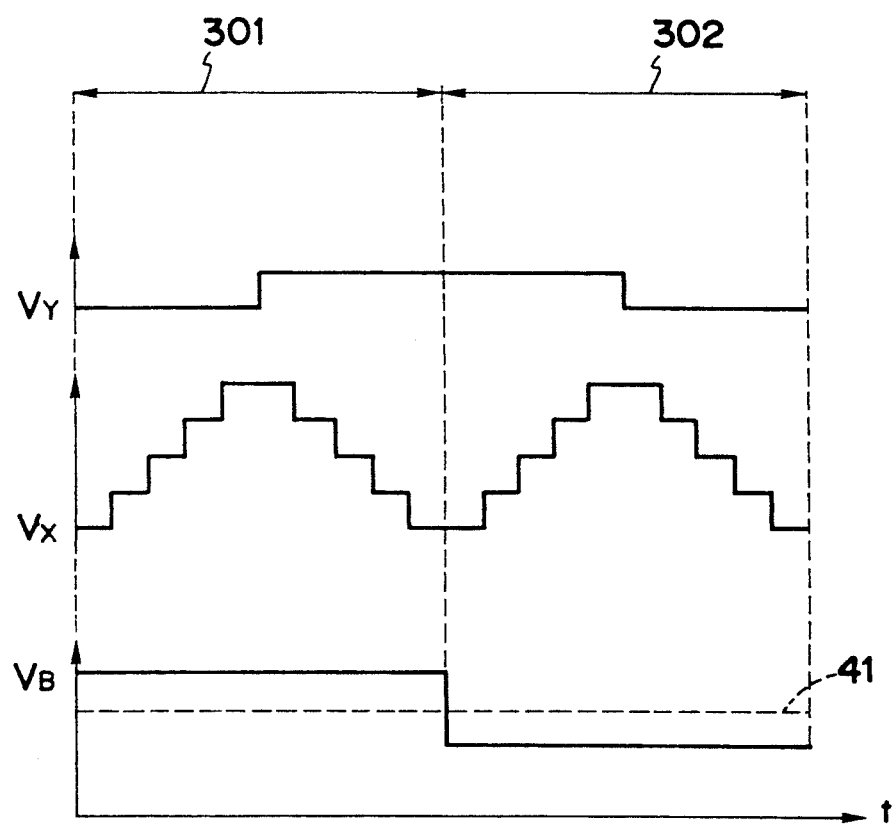
FIG. 6A and FIG. 6B are a time chart showing driving voltage and applied voltage at the time of information reproducing in an information recording and reproducing apparatus of a fourth embodiment according to the present invention, and a time chart showing driving voltage and applied voltage at the time of information recording in the apparatus, respectively.
Figure 6B:
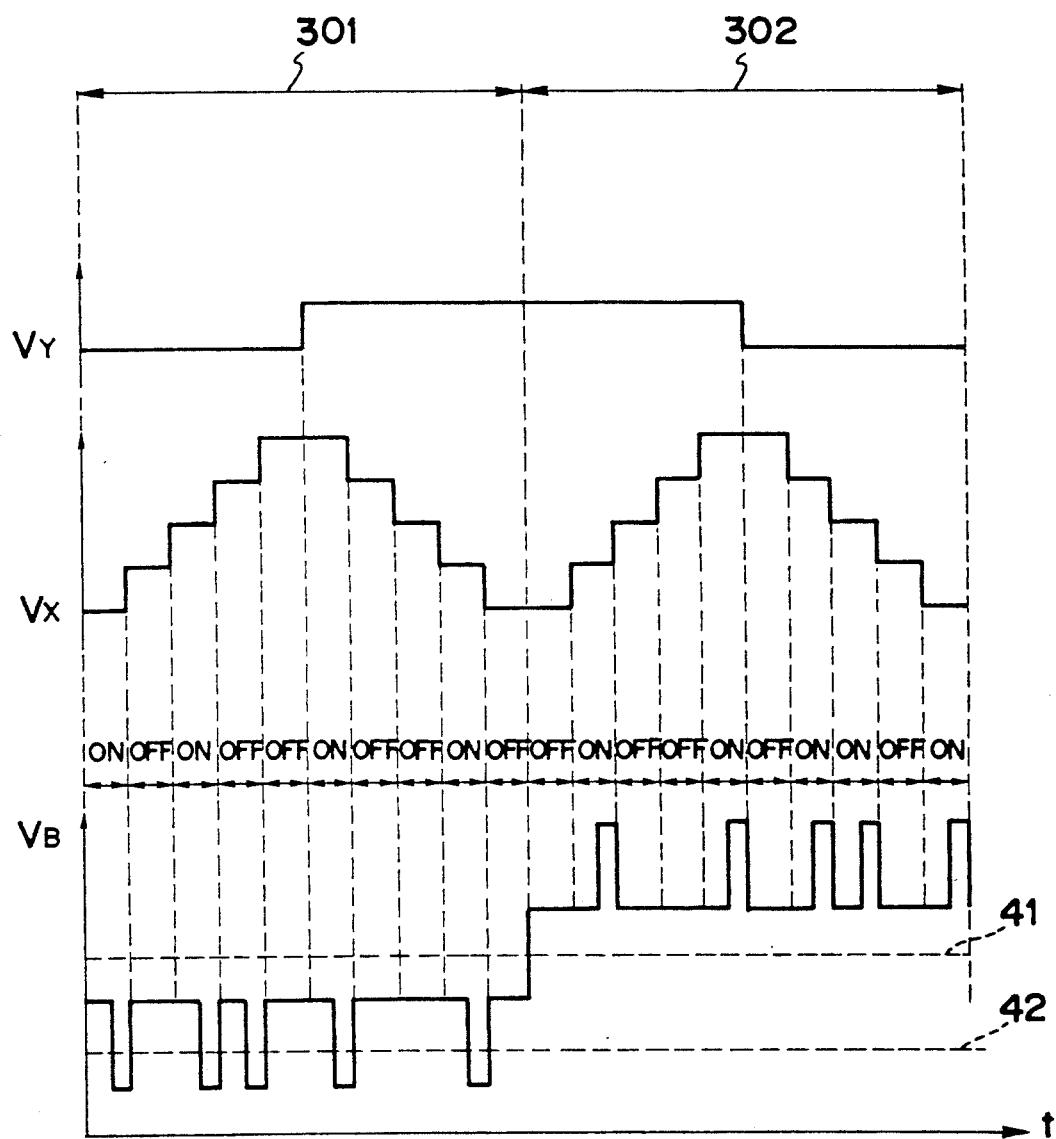

FIGS. 6A and 6B are views showing a fourth embodiment according to the present invention. The fourth embodiment is also the same as the first embodiment with the exception of the aspects given below. Therefore, the description will be made only by the same time chart as in FIG. 3. The fourth embodiment is directed to recording and reproducing systems characterized in that when the probe electrode 10 travels along the surface of the recording medium 21 to scan a plurality of frames (one transversal row designated by the reference mark ◯ in FIG. 2B is assumed to be one frame) at the time of information recording and reproducing, applied voltages between the probe electrode and the recording medium are defined so that the integration average of the voltages applied between the probe electrode and substrate electrode in scanning the plurality of frames should become substantially zero.

In particular, the fourth embodiment is characterized in that performed is the recording and reproducing of the information block which is the frame scanning in which the probe electrode is scanned along the surface of the recording medium an even-number of times, i.e., 2N-times (where N is a natural arbitrary number), and the absolute value of the applied voltage between the probe electrode 10 and recording medium 21 is equalized at the time of one N-time frame scanning and the remaining N-time frame scanning in the frame scanning of the even-numbered times (2N) to change the voltage polarities (plus and minus) each other (this changing being performed in the odd-numbered time and even-numbered time, for example), whereby the value of time integration of the applied voltage $V_B$ is made substantially zero for the block as a whole.

Particularly, the present embodiment is characterized in that the recording and reproducing of the information block requiring a two-time frame scanning are performed, and that the absolute values of the applied voltages between the probe electrode and recording medium in the two-time frame scanning are equalized to change the voltage polarities of each other so as to make the value of time integration of the applied voltage $V_B$ substantially zero in each of the two frames.

FIG. 6A is a time chart at the time of information reproducing and FIG. 6B is a time chart at the time of information recording.

Figure 6C:
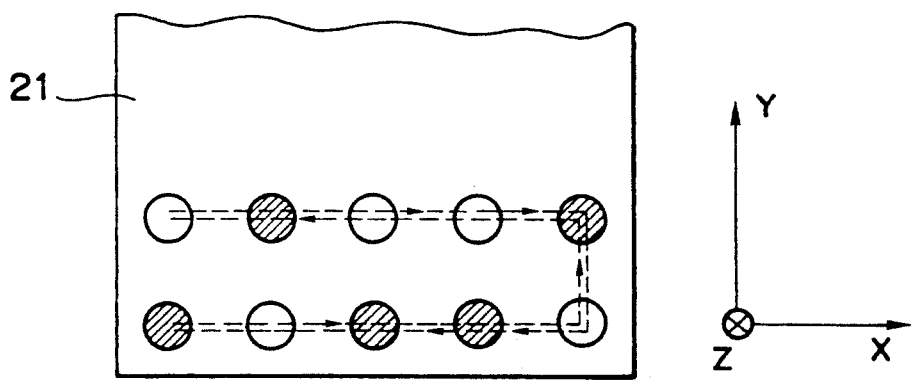
FIG. 6C is a view schematically showing a manner of information recording and reproducing in the apparatus.

In FIGS. 6A and 6B, a numeral 301 designates the frame scanning period for a first time; 302, the frame scanning period for a second time. Also, in FIGS. 6A and 6B, reference marks $V_Y$ and $V_X$ designate the driving waveforms of the same means 11 to cause the probe electrode to travel along the surface of the recording medium as in FIG. 2A, and in the frame scanning portion for the second time, the probe electrode is arranged to travel in the opposite directions while drawing the same track on the recording medium. The manner of recording and reproducing at this juncture, i.e., the way of traveling of the probe electrode 10, are represented in FIG. 6C using the same schematic view of FIG. 2B.

In FIG. 6A, the voltage $V_B$ is $V_B = +V_{BO}$ (where $V_{BO}$ is a constant) for the frame scanning period for the first time, and $V_B = -V_{BO}$ for the frame scanning period for the second time.

In FIG. 6B, the voltage $V_B$ is defined to provide its value of $V_B$ equivalent to a value suited for detecting the tunnel current $J_T$ in the period represented by "off" during the frame scanning period 301 in order to control the averaged space between the probe electrode 10 and recording medium 21 constantly by the space controlling means for controlling the distance therebetween. This value should be smaller than the threshold value generating a change (shifting to the "on" state) in the medium 21.

Also, during the application period (represented by "on") of the voltage changing the medium, the state where the value of the voltage $V_B$ is equal to the one during the period represented by "off" is maintained in the most part of this period, and the value of the voltage $V_B$ should be made to exceed the threshold only in the last short period. Then, in the frame scanning period 301 after the completion of the scanning for the first time, the voltage application at each position during the frame scanning period 301 is repeated at the same position in the same manner while inverting the polarities of the waveforms of the respective applied voltages.

In the fourth embodiment, the accumulation of the surface charge to the surface of the recording medium is prevented by defining the applied voltage between the probe electrode and recording medium to make the integration average at each position substantially zero in a plurality of frame scannings.

Also, in particular, it is possible to inspect whether or not the data reading has been performed correctly by executing the reading with a plurality of frame scannings. For example, information for detection errors is provided in one information block, and it may be possible to output the information which has been read with the least error as correctly reproduced information among those plural readings at the time of reproducing.

Likewise, by writing information onto the recording medium for plural times (two times), a recording and reproducing apparatus particularly capable of avoiding writing failure can be implemented.

Now in conjunction with FIG. 7 and FIGS. 8A to 8D, a fifth embodiment according to present invention will be described.

FIG. 7 is a view schematically showing the structure of the fifth embodiment. The fifth embodiment is an apparatus for recording, reproducing, and erasing by the use of a plurality of probe electrodes having means to enable them to travel along the surface of the recording medium. In FIG. 7, reference numerals 401 and 402 designate the same electrode as the probe electrode 10 shown in FIG. 1, respectively. The probe electrode 401 is provided with x-y direction fine traveling control mechanism 11a, z-direction fine traveling control mechanism 12a, y-axial scanning driver 13a, x-axial scanning driver 14a, voltage application means 15a, servo circuit 16a, and current detection means 17a as in the case of FIG. 1. The operation of each constituent is substantially the same as each of those described in the first embodiment.

The probe electrode 402 is also provided with x-y direction fine traveling control mechanism 11b, z-direction fine traveling control mechanism 12b, y-axial scanning driver 13b, x-axial scanning driver 14b, voltage application mean 15b, servo circuit 16b, and current detection means 17b as in the case of FIG. 1. The operation of each constituent is substantially the same as each of those described in the first embodiment. The probe electrodes 401 and 402 are set apart by $X_O$ (constant) from each other, and individually travel in an area corresponding to a certain block by the x-y direction fine travel driving voltages $V_{X1}$, $V_{X2}$, and $V_{Y1}$, $V_{Y2}$, respectively, while by a rough traveling driver 18, an x-y stage 24 is driven to cause each of the probe electrodes to travel evenly $X_O$ by $X_O$ to perform recording and reproducing. The present embodiment is a recording and reproducing apparatus wherein the integration average of the voltages applied between the plural electrodes and the substrate electrode at each bit on the recording medium in a certain period is substantially zero.

In particular, the present embodiment is characterized in that the recorded data in a certain block in the recording medium is read by the use of a pair of probe electrodes 401 and 402 which apply voltages having equal absolute values in each of the blocks between the probe electrodes and substrate electrode but opposite polarities to each other. This pair of electrodes may be provided for a plurality of the same pairs thereof.

In FIG. 7, the probe electrodes 401 and 402 are the probe electrodes which apply the voltages $V_{B1}$ and $V_{B2}$ having the equal absolute values between the probe electrode and the substrate electrode, and the opposite polarities to each other, by the voltage application means 15a and 15b. In other words, for example, the voltages applied at the time of information reproducing are $V_{B1} = +V_{BO}(>0)$, $V_{B2} = -B_{BO}$ ($<0$) (where $B_{BO} > 0$ is a real number).

Figure 8A:
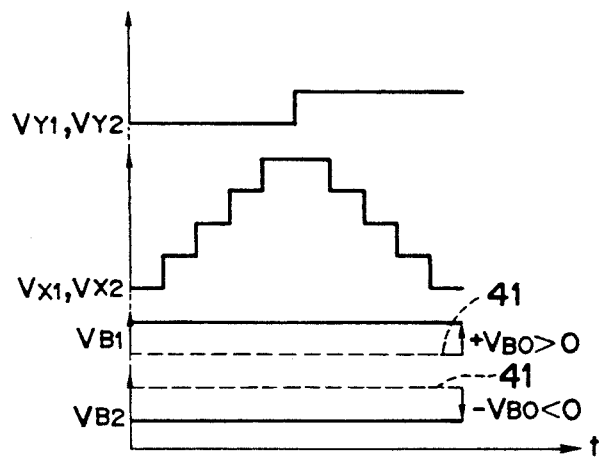
FIG. 8A is a time chart showing driving voltage and applied voltage at the time of information reproducing in the apparatus.

FIG. 8A is the same time chart as FIG. 2A which shows each of the voltages applied to the two probe electrodes 401 and 402 at the time of information reproducing in one view.

Here, with the exception of the central positions which are different, the probe electrodes 401 and 402 scan the recording medium in the same track with the applied voltages having opposite polarities but the same absolute values.

Figure 8B:
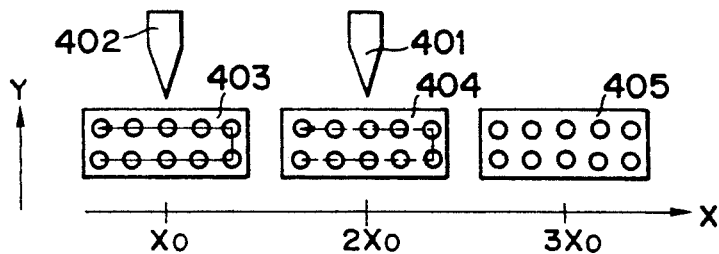
FIG. 8B and FIG. 8C are views schematically showing a positional relationship between each of the probes and each of the block areas in the apparatus.

FIG. 8B is a view schematically showing the positional relationship between each area of the information blocks and each of the probe electrodes at a certain time.

At the time represented by FIG. 8B, the probe electrode 402 faces the block area 403 on the recording medium while the probe electrode 401 faces another block area 404 adjacent thereto on the recording medium. Then, by applying bias voltages $V_{B1}$, and $V_{B2}$ each having opposite polarities but the same absolute values, the data in the block areas 403 and 404 are read with the probe electrodes which travel along the positions designated by the mark ○ sequentially as indicated by the arrow on each of the block areas as in the case shown in FIG. 2B.

Figure 8C:
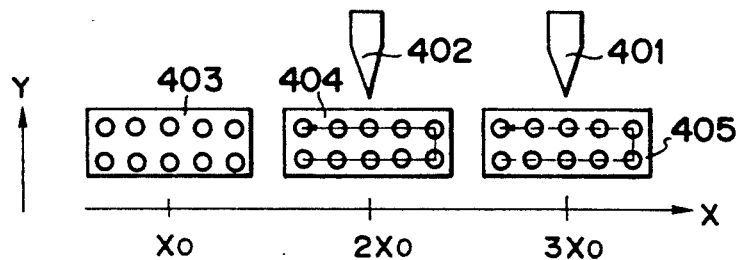

FIG. 8C is a schematic view the same as FIG. 8B and shows the state where the probe electrodes 401 and 402 have traveled on the surface of the recording medium by the distance $X_O$ in the same direction by the x-y stage 24 driven by the rough traveling driver 18 subsequent to the completion of the reading at the state shown in FIG. 8B, and by this shifting, the probe electrode 402 is caused to face the block area 404 and the probe electrode 401, another block area 405 adjacent thereto on the recording medium. Then FIG. 8C further illustrates the probe electrodes reading the data in the block areas 404 and 405 with the driving waveforms shown in FIG. 8A as in the case of FIG. 8B.

With the operation set forth above, the block area 404 is scanned in the same track by the bias voltages having opposite polarities to each other such as minus in the first stage and plus in the second stage but the same absolute values. As a result, the charge accumulated on the recording medium 21 is offset. The, the data reading in each of the block area is performed two times each by the probe electrodes 401 and 402. In this respect, the minus voltage is applied by the probe electrode 401 in the first stage to the block area 402, and the plus voltage by the probe electrode 402 in the second stage for example.

Figure 8D:
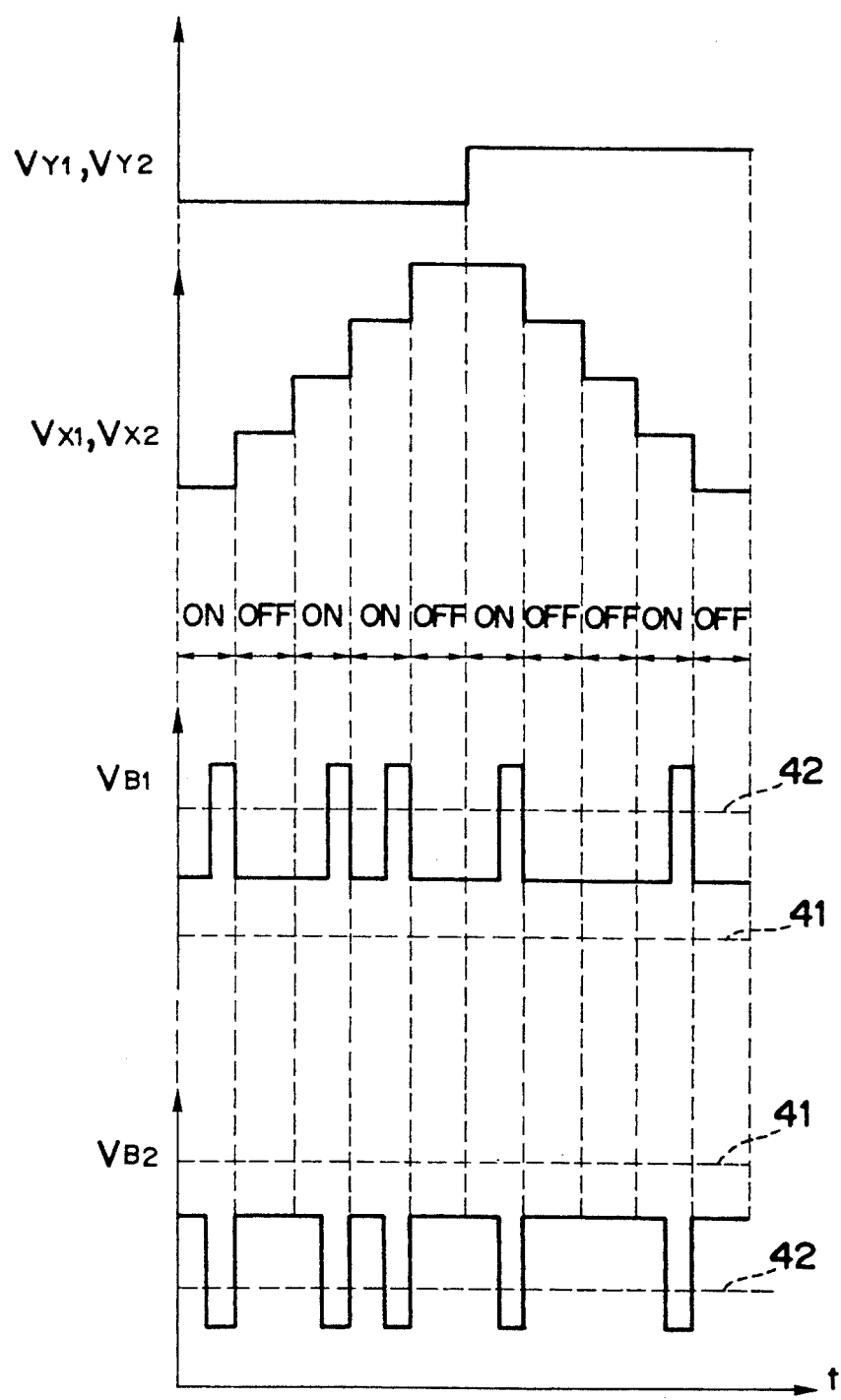
FIG. 8D is a time chart showing driving voltage and applied voltage at the time of information recording in the apparatus.

FIG. 8D is a view showing each of the voltages applied at the time of information recording with the use of the same timing chart shown in FIG. 8A. The value of voltage $V_B$ in the period represented by "off" should be the value suited for detecting the tunnel current $J_T$ to control the averaged space between each of the probe electrodes and the recording medium 21 constantly by the space controlling means to control the distance therebetween. This value should be smaller than the threshold value generating the change (shifting to the "on" state) in the medium 21.

Also, during the period of applying the medium changing voltage, which is represented by "on", the state in which the value of the voltage $V_B$ is the same during the period represented by "off", should be maintained in the most part of the period so that the value of the voltage $V_B$ should exceed the threshold value in the last short period.

Then, each of the probe electrodes 401 and 402 is driven relatively against the recording medium 21 as in the case of the information reproducing, and when both probe electrodes scan the same block area, the voltages having different waveforms are applied only at the point where the polarities are changed as $V_{B1}$ and $V_{B2}$ shown in FIG. 8D. By repeating this process for each of the block areas, the same effect as in the information reproducing can be obtained. Also, particularly, by writing information plural times (two times) on the same block area, it is possible to implement a recording and reproducing apparatus capable of avoiding writing failure.

As the above describes, in the fifth embodiment, a pair of probe electrodes having opposite polarities but the equal absolute values are driven to travel $X_0$ by $X_0$ as mentioned above to scan the block areas to reproduce information one after another, thus making it possible to offset the accumulated changes in the entire areas of the recording medium.

Also, by the use of a plurality of probe electrodes to remove the charges electrically, it is possible to write or read information onto or from the recording medium plural times (two times) without prolonging the reading or writing time, and to implement effectively a recording and reproducing apparatus capable of avoiding the possibility of writing failure or reading error.

Figure 9:
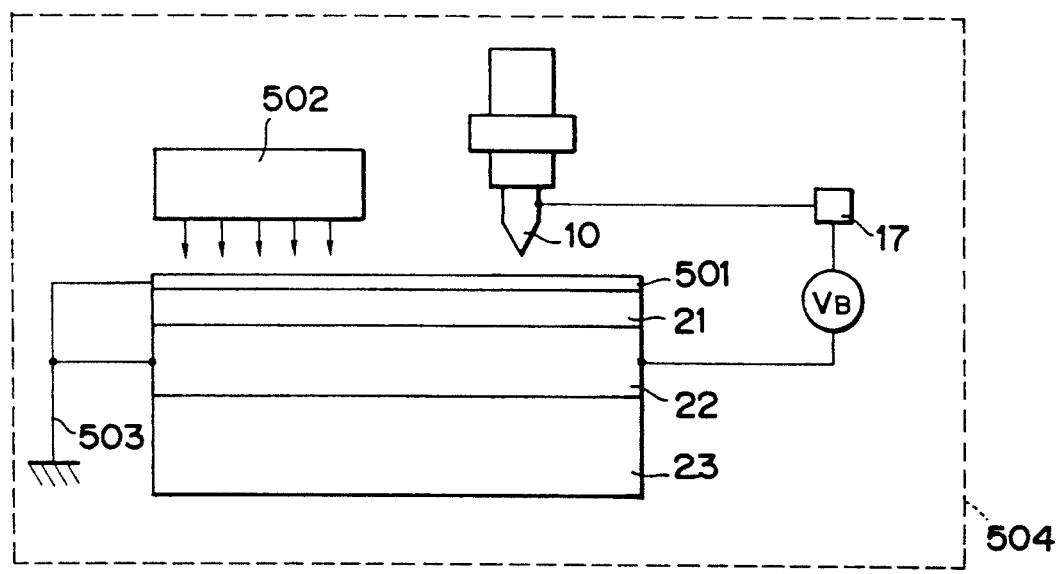
FIG. 9 is a schematic view partially showing structure of an information recording and reproducing apparatus of a sixth embodiment according to the present invention.

FIG. 9 is a view partially showing the structure of a sixth embodiment according to the present invention. With the exception of the aspects set forth below, the structure of the present embodiment is the same as the one shown in FIG. 1. Accordingly, FIG. 9 illustrates only a part of its structure.

The sixth embodiment is characterized in that provided is a photo-conductive extra-thin film layer 501 connected to the substrate electrode on the recording medium 21 having the electric memory effect and grounded, and that after the recording and reproducing is performed by the probe electrode 10 under the state that the photoconductivity layer 501 is made highly resistive, the photoconductive layer 501 is irradiated by light from a light source 502 to make it low resistive.

In FIG. 9, a numeral 504 designates a cover shielding the system from the outside; and 503, the grounding point of the photoconductive extra thin film layer 501 and the substrate electrode 22. Although the charge is accumulated in the recording medium or on the surface thereof by the probe electrode 10 to perform recording and reproducing, it is possible to discharge the accumulated charge in the recording medium or on the surface thereof by making the photoconductivity layer 501 low resistive with the light irradiation from the light source 502 after recording and reproducing as well as by the grounding point to which the layer 501 is connected together with the substrate electrode 22, thereby offsetting the remaining charge. In the present embodiment, the recording and reproducing can be performed by well known methods such as disclosed in Japanese Patent Laid-Open Application No. 63-161552, Japanese Patent Laid-Open Application No. 63-161553, and others.

FIG. 10 is a view showing a seventh embodiment of the recording and reproducing apparatus according to the present invention.

With the exception of the aspects set forth below, the structure of the seventh embodiment is also the same as the one shown in FIG. 1. Accordingly, FIG. 10 illustrates only a part of its structure. The seventh embodiment is characterized by having a grounding means connected to the substrate electrode 22 for the grounding and capable of arbitrarily selecting the electrical non-connecting state or connecting state against the recording medium.

In particular, a movable grounding plate 601, capable of traveling along the surface of the recording medium and of contacting closely with an arbitrary surface thereof, is used as the grounding means. The movable grounding plate 601 is connected to the substrate electrode 22 and is grounded as designated by a numeral 602.

The seventh embodiment is such that after the recording and reproducing by the probe electrode 10 using the well known method as in the sixth embodiment, the movable grounding plate 601 is allowed to be in contact with the surface of the recording medium closely to discharge the accumulated charge on the surface of the redording medium or in its inside.

Figure 11:
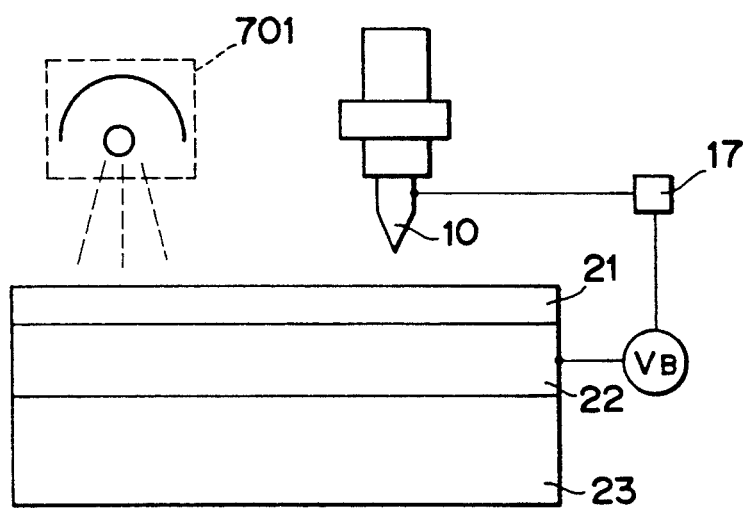
FIG. 11 is a schematic view partially showing structure of an information recording and reproducing apparatus of an eighth embodiment according to the present invention.

FIG. 11 is a view showing an eighth embodiment of the present invention.

With the exception of the aspects set forth below, the structure of the present embodiment is also the same as the one shown in FIG. 1. Accordingly, FIG. 11 illustrates only a part of its structure. The eighth embodiment is characterized in that the charge deposited in the recording medium or on the surface thereof is neutralized by spreading charged particles over the surface of the recording medium.

In FIG. 11, numeral 701 designates a corona discharging unit. In other words, in the eighth embodiment, subsequent to the recording and reproducing by the probe electrode 10 with the well known method as in the first embodiment, the corona discharge with an appropriate amount of the charged particles having polarity offsetting the accumulated charge of the applied voltage $V_B$ is performed by the use of the corona discharging unit 701.

In the descriptions of the above-mentioned embodiments, while an organic film having memory switching characteristics is exemplified as the recording medium 21, the present invention is not limited thereto, and it may be possible to use a medium which enables a gold thin film to generate changes in shape as the medium having the electric memory effect, for example. The present invention is applicable to the case that the recording is made onto such a medium and the information reproducing is performed by detecting the shapes recorded. In some cases, even if a gold thin film is used, the charge may also be accumulated on the extreme vicinity of the surface, and if there is such a problem, the present invention can be expected to obtain the aforesaid advantages.

The above-mentioned first through sixth embodiments are particularly characterized in that the driving voltage $V_Y$ in the axial direction Y has the staged waveforms, and the driving voltage $V_X$ in the axial direction X has the staged waveforms of different frequency in synchronism with $V_Y$, and the average of the applied voltages is zero in the period during which the application state of ($V_X$, $V_Y$) is selected in a condition that the waveforms of the voltages applied to the recording medium are in synchronism with $V_X$ and $V_Y$, i.e., the suspension period at the positions designated by the mark ◯. However, the present invention is not limited thereto.

For example, it may be possible to make the driving voltage $V_Y$ in the axial direction Y, a voltage waveform of trigonometrical waveform, and the driving voltage $V_X$ in the axial direction X, a voltage waveform of trigonometrical waveform of different frequency in synchronism with $V_Y$. Even with this arrangement, it is possible to make the average of the applied voltages zero in the period during which the traveling probe electrode scans the area of one bit to plural bit portions in a state where the waveforms of voltages applied to the recording medium are in synchronism with $V_X$ and $V_Y$.

Also, while the above-mentioned embodiments are directed to a recording and reproducing apparatus, the present invention may also be applicable to an apparatus which performs only recording or reproducing.

Also, the present invention can suitably be used for the STM system and its application equipment employed as an information reading apparatus.

With each of the embodiments set forth above, it becomes possible to perform a highly precise information reading or inputting at all times without producing any adverse effects on the information medium due to the charge accumulation caused by the applied voltage.

What is claimed is:

1. An apparatus for reading information from an information medium and/or inputting information to the information medium through a probe electrode, comprising:
   voltage application means for applying a voltage between said probe electrode and said information medium, wherein the information is read from the information medium and/or the information is inputted to the information medium by a voltage application of said voltage application means; and
   charge removing means by which a charge removing process on the information medium to which the voltage is applied by said voltage application means is performed while maintaining the information in said information medium.

2. An apparatus according to claim 1, further comprising scanning means for enabling said probe electrode and said information medium to travel relatively so that the information medium is scanned by said probe electrode.

3. An apparatus according to claim 2, wherein said charge removing means includes controlling means for controlling the voltage application to said voltage application means so as to make an integration value of the applied voltage substantially zero in each of predetermined scanning blocks of which said probe electrode is scanned on said information medium.

4. An apparatus according to claim 3, wherein said controlling means controls the voltage application so as to make the integration value of the applied voltage substantially zero in each of the scanning blocks of one bit information portions on said information medium.

5. An apparatus according to claim 3, wherein said controlling means controls the voltage application so as to invert a polarity of the applied voltage of said voltage application means in said predetermined block of which said probe electrode is scanned on said information medium.

6. An apparatus according to claim 5, wherein said controlling means controls the voltage application so as to apply a voltage whose absolute value differs from a voltage used for information reading and/or inputting, before or after inverting the polarity of the applied voltage.

7. An apparatus according to claim 3, wherein said scanning means causes said probe electrode to scan a predetermined area on said information medium plural times, and upon a scanning period during at least a portion of the plural scannings said controlling means inverts a polarity of the voltage applied between said probe electrode and said information medium at the time of information reading and/or inputting to the opposite polarity of the applied voltage in the other scanning period.

8. An apparatus according to claim 2, wherein said charge removing means includes:
   a second probe electrode for scanning again an area scanned by said probe electrode; and
   second voltage application means for applying a voltage between said second probe electrode and said information medium, said voltage having an opposite polarity to the voltage applied between said probe electrode and said information medium by said voltage application means at the time of information reading and/or inputting.

9. An apparatus according to claim 1, wherein said voltage application means applies the voltage between the probe electrode and a medium having a photoconductive thin film formed on a layer for information recording and/or reproducing as said information medium, and said charge removing means includes means for irradiating light on said photoconductive thin film.

10. An apparatus according to claim 1, wherein said charge removing means includes grounding means attachable to or detachable from said information medium.

11. An apparatus according to claim 1, wherein said charge removing means includes means for disseminating charged particles over the information medium.

12. A method for reading information from an information medium and/or inputting information to the information medium through a probe electrode, comprising the steps of:

applying a voltage between said probe electrode and said information medium, wherein the information is read from the information medium and/or the information is inputted to the information medium by said voltage application; and performing a charge removing process on the information medium to which the voltage is applied by said voltage application, said charge removing process being performed while maintaining the information in said information medium.

13. A method according to claim 12, further comprising a scanning step for enabling said probe electrode and said information medium to travel relatively so that the information medium is scanned by said probe electrode, wherein said voltage application is performed during said relative traveling.

14. A method according to claim 13, wherein said charge removing process includes a controlling step for controlling the voltage application so as to make an integration value of the applied voltage substantially zero in each of predetermined scanning blocks where said probe electrode is scanned on said information medium when said voltage is applied.

15. A method according to claim 14, wherein said controlling step is performed to make the integration value of the applied voltage substantially zero in each of the scanning blocks of one bit information portions on said information medium.

16. A method according to claim 14, wherein said controlling step performs the voltage application control to invert a polarity of the applied voltage of said voltage application step in said predetermined block where said probe electrode is scanned on said information medium.

17. A method according to claim 16, wherein said controlling step is performed to apply a voltage, whose absolute value differs from the voltage used for information reading and/or inputting, before or after inverting the polarity of the applied voltage.

18. A method according to claim 14, wherein said relative traveling includes the scanning by said probe electrode in a predetermined area on said information medium plural times, and upon a scanning period during at least a portion of the plural scannings said voltage application control is performed by inverting the polarity of the voltage applied between said probe electrode and information medium at the time of information reading and/or inputting to the opposite polarity of the applied voltage in the other scanning period.

19. A method according to claim 13, wherein said charge removing process includes a subsequence scanning step performed by a second probe electrode different from said probe electrode in an area scanned by said probe electrode, and a second voltage application step in said scanning, wherein said second voltage application is performed by applying between said probe electrode and said information medium a voltage having an opposite polarity to the voltage applied between said probe electrode and information medium by said voltage application at the time of information reading and/or inputting.

20. A method according to claim 12, wherein said voltage application step is performed between the probe electrode and a medium having a photoconductive thin film formed on a layer for information recording and/or reproducing as said information medium, and said charge removing process is performed by irradiating light on said photoconductive thin film.

21. A method according to claim 12, wherein said charge removing process is performed by attaching a grounding means to said information medium.

22. A method according to claim 12, wherein said charge removing process is performed by disseminating charged particles over said information medium.

23. An apparatus for reading information from an information medium and/or inputting information to the information medium through a probe electrode, comprising:

a fine traveling mechanism for causing said probe electrode and said information medium to travel relatively so that said information medium is scanned by said probe electrode;

a voltage application circuit for applying a voltage between said probe electrode and said information medium which are caused to travel relatively by said fine traveling mechanism, wherein the information is read from the information medium and/or the information is inputted to the information medium by the voltage application by said voltage application circuit; and a controller for performing the voltage application control to said applied voltage of said voltage application circuit to make an integration value of the applied voltage substantially zero in each of predetermined scanning blocks of which said probe electrode is scanned on said information medium.

24. An apparatus for reading information from an information medium and/or inputting information to the information medium through a probe electrode, comprising:

a fine traveling mechanism for causing said probe electrode and said information medium to travel relatively so that said information medium is scanned by said probe electrode;

a voltage application circuit for applying voltage between said probe electrode and said information medium which are caused to travel relatively by said fine traveling mechanism, wherein the information is read from the information medium and/or the information is inputted to the information medium by the voltage application of said voltage application circuit;

a second probe electrode for scanning again an area scanned by said probe electrode; and a second voltage application circuit for applying a voltage between said second probe electrode and said information medium, said voltage having an opposite polarity to the voltage applied between said probe electrode and said information medium by said voltage application at the time of information reading and/or inputting.

* * * * *

UNITED STATES PATENT AND TRADEMARK OFFICE
CERTIFICATE OF CORRECTION

PATENT NO. : 5,204,851
DATED : April 20, 1993
INVENTOR(S) : Haruki Kawada, et al.

It is certified that error appears in the above-indentified patent and that said Letters Patent is hereby corrected as shown below:

ON THE COVER PAGE

UNDER "U.S. PATENT DOCUMENTS"

Insert: --2,972,082  2/1961  Kallmann, et al.
         3,202,973  8/1965  Brophy--

UNDER "FOREIGN PATENT DOCUMENTS"

Insert: --  896,691   6/1962  United Kingdom
          1,318,898   1/1963  France
          0 249 199  12/1987  Europe--

UNDER "OTHER PUBLICATIONS"

Insert: --Patent Abstracts of Japan, Kokai No. 57-133534, Vol. 6, No. 233, 11/1982.--

IN THE DISCLOSURE

COLUMN 1

Line 26, "general" should read --general,--;
Line 28, "responsibility" should read --response--;
Line 54, "together" should read --other--; and
Line 64, "STM" should read --STM,--.

COLUMN 2

Line 36, "on" should be deleted.

UNITED STATES PATENT AND TRADEMARK OFFICE
CERTIFICATE OF CORRECTION

PATENT NO. : 5,204,851
DATED : April 20, 1993
INVENTOR(S) : Haruki Kawada, et al.

It is certified that error appears in the above-indentified patent and that said Letters Patent is hereby corrected as shown below:

COLUMN 3

Line 65, "volta" should read --voltage--.

COLUMN 4

Line 66, "X-Y" should read --x-y--.

COLUMN 6

Line 43, "volta" should read --voltage--; and
    Line 67, "$[V_B(t)dt]=0$" should read --$[\int V_B(t)dt]=0$--.

COLUMN 8

Line 50, "its" should be deleted.

COLUMN 9

Line 19, "in case" should read --in this case--.

COLUMN 10

Line 41, "performed is" should read --there is performed--;
    Line 51, "each" should read --of each--; and
    Line 59, "are" should read --is--.

COLUMN 11

Line 55, "for" should be deleted.

UNITED STATES PATENT AND TRADEMARK OFFICE
CERTIFICATE OF CORRECTION

PATENT NO. : 5,204,851

DATED : April 20, 1993

INVENTOR(S) : Haruki Kawada, et al.

It is certified that error appears in the above-indentified patent and that said Letters Patent is hereby corrected as shown below:

COLUMN 12

Line 45, "$-B_{80}$" should read -- $-V_{80}$ --; and
Line 46, "$B_{80}$" should read -- $V_{80}$ --.

COLUMN 13

Line 11, "another" should read --and another--;
Line 12, "Then" should read --Then,--;
Line 21, "The, the" should read --Then, the--;
Line 22, "area" should read --areas--;
Line 26, "stage" should read --stage,--; and
Line 61, "the" should be deleted.

UNITED STATES PATENT AND TRADEMARK OFFICE
CERTIFICATE OF CORRECTION

PATENT NO. : 5,204,851
DATED : April 20, 1993
INVENTOR(S) : Haruki Kawada, et al.

It is certified that error appears in the above-indentified patent and that said Letters Patent is hereby corrected as shown below:

COLUMN 14

Line 12, "extra-thin" should read --extra thin--; and
Line 64, "redording" should read --recording--.

COLUMN 17

Line 65, "subsequence" should read --subsequent--.

Signed and Sealed this

Fifteenth Day of March, 1994

BRUCE LEHMAN

*Attest:*

*Attesting Officer*  *Commissioner of Patents and Trademarks*